(12) United States Patent
Noda et al.

(10) Patent No.: US 9,709,592 B2
(45) Date of Patent: Jul. 18, 2017

(54) WHEEL SPEED SENSOR

(71) Applicant: AISIN SEIKI KABUSHIKI KAISHA, Kariya-shi, Aichi (JP)

(72) Inventors: Takanori Noda, Ichinomiya (JP); Koji Kawasaki, Kariya (JP); Hidenobu Muramatsu, Kariya (JP); Gota Uehara, Anjo (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 100 days.

(21) Appl. No.: 14/414,817

(22) PCT Filed: Jul. 22, 2013

(86) PCT No.: PCT/JP2013/069802
§ 371 (c)(1),
(2) Date: Jan. 14, 2015

(87) PCT Pub. No.: WO2014/021129
PCT Pub. Date: Feb. 6, 2014

(65) Prior Publication Data
US 2015/0204898 A1     Jul. 23, 2015

(30) Foreign Application Priority Data

Jul. 30, 2012  (JP) ................................. 2012-168708

(51) Int. Cl.
*G01P 3/44*       (2006.01)
*G01P 3/487*      (2006.01)
(Continued)

(52) U.S. Cl.
CPC ............... *G01P 3/44* (2013.01); *G01D 11/30* (2013.01); *G01P 1/00* (2013.01); *G01P 1/026* (2013.01);
(Continued)

(58) Field of Classification Search
CPC ......................................................... G01P 3/44
See application file for complete search history.

(56) References Cited

U.S. PATENT DOCUMENTS 5,967,473 A * 10/1999 Singbartl ................ B60T 8/171
                                                          248/200
6,127,819 A * 10/2000 Ouchi ....................... G01P 1/02
                                                          324/173
(Continued)

FOREIGN PATENT DOCUMENTS

DE         19639075 A1     3/1998
DE         19847863 A1     5/1999
(Continued)

OTHER PUBLICATIONS

Communication dated Sep. 15, 2015 from the Japanese Patent Office in counterpart application No. 2012-168708.

(Continued)

*Primary Examiner* — Paul West
*Assistant Examiner* — Mark A Shabman
(74) *Attorney, Agent, or Firm* — Sughrue Mion, PLLC

(57) ABSTRACT

A wheel speed sensor capable of stabilizing a projecting posture of a sensor unit when attached to a vehicle is provided. The wheel speed sensor includes a mounting base providing a first contacting part and a second contacting part when attached to the vehicle to come into contact with the vehicle at two positions of the first contacting part and the second contacting part, the sensor unit projecting from a position between the first contacting part and the second contacting part and inclining toward the first contacting part, the sensor unit being resin molded integrally with the mounting base and including a signal detection device provided in a distal end of the sensor unit, and a fixing member pressing and fixing the mounting base to the vehicle (Continued)

at a position between the first contacting part and the sensor unit.

4 Claims, 4 Drawing Sheets

(51) Int. Cl.
  *G01P 1/00* (2006.01)
  *G01P 1/02* (2006.01)
  *G01P 3/488* (2006.01)
  *G01D 11/30* (2006.01)
  *G01D 5/14* (2006.01)

(52) U.S. Cl.
  CPC .............. *G01P 3/487* (2013.01); *G01P 3/488* (2013.01); *G01D 5/145* (2013.01)

(56) References Cited

U.S. PATENT DOCUMENTS

| 2003/0209658 | A1 | 11/2003 | Iguchi et al. |
| 2006/0260418 | A1 | 11/2006 | Tsuge |

FOREIGN PATENT DOCUMENTS

| JP | 60158569 A | 8/1985 |
| JP | 2000-149343 A | 5/2000 |
| JP | 2001266319 A | 9/2001 |
| JP | 2003-307440 A | 10/2003 |
| JP | 2004-257867 A | 9/2004 |
| JP | 2006-226488 A | 8/2006 |
| JP | 2006-322875 A | 11/2006 |
| JP | 2008025530 A | 2/2008 |
| JP | 2011-242188 A | 12/2011 |

OTHER PUBLICATIONS

Communication dated Jan. 11, 2016 from the German Patent Office in counterpart application No. 112013003759.9.

Communication dated Feb. 12, 2015, issued by the International Bureau of WIPO in counterpart International Application No. PCT/JP2013/069802.

International Search Report for PCT/JP2013/069802 dated Oct. 8, 2013.

* cited by examiner

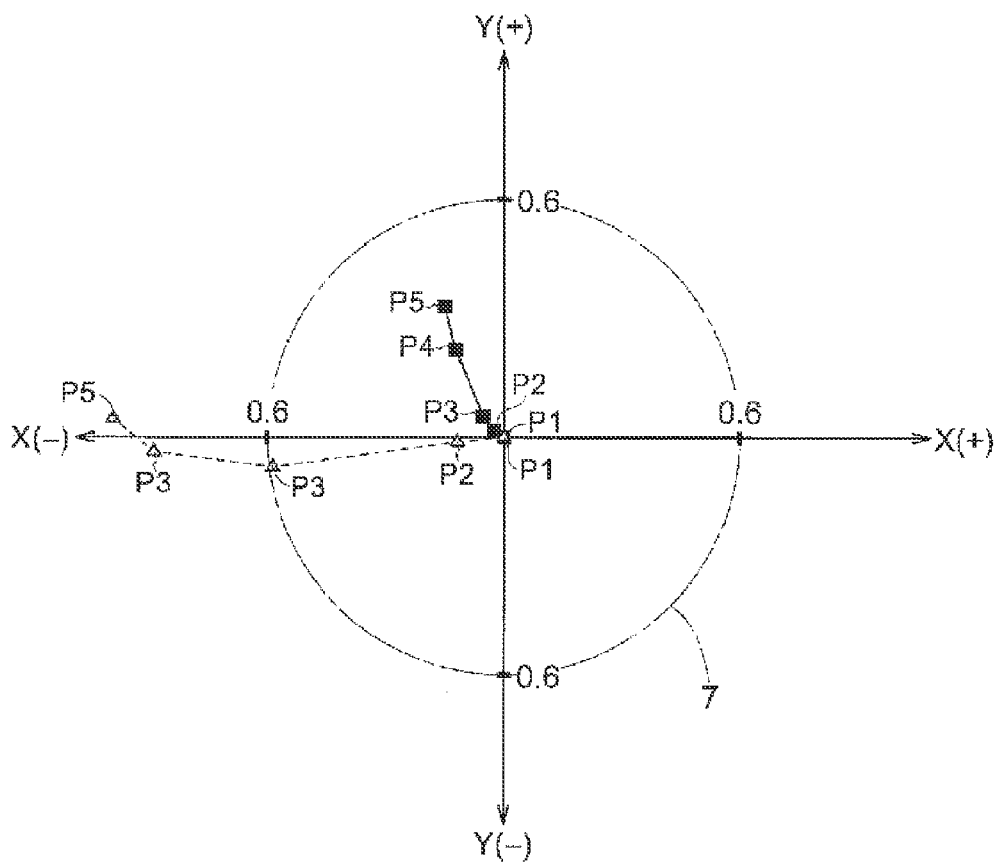
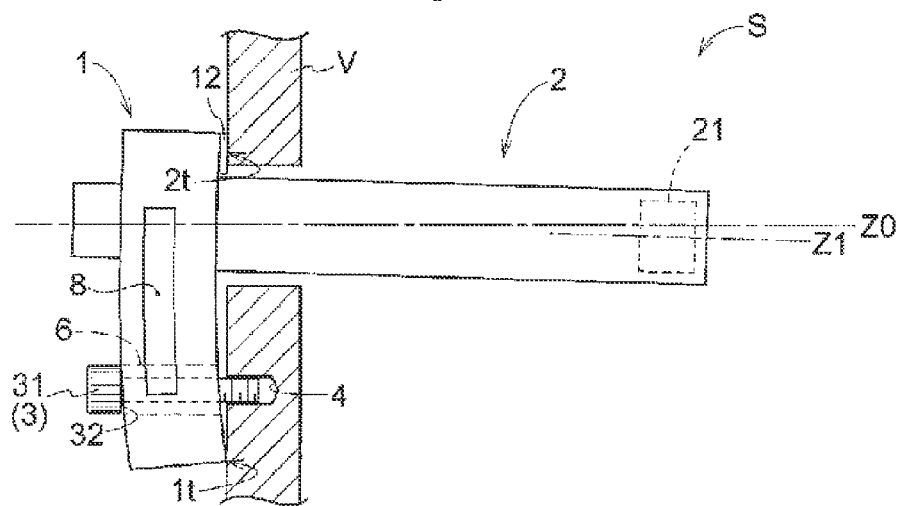

WHEEL SPEED SENSOR

CROSS REFERENCE TO RELATED APPLICATIONS

This application is a National Stage of International Application No. PCT/JP2013/069802 filed Jul. 22, 2013, claiming priority based on Japanese Patent Application No. 2012-168708 filed Jul. 30, 2012, the contents of all of which are incorporated herein by reference in their entirety.

TECHNICAL FILED

The present invention relates to a wheel speed sensor including a mounting base attached to a vehicle, a sensor unit that is resin molded integrally with and projecting from the mounting base and having a signal detection device in a distal end of the sensor unit, and a fixing member for fixing the mounting base to the vehicle.

BACKGROUND ART

Examples of conventional wheel speed sensors of this type are given below.

Patent Literature 1 (Japanese Unexamined Patent Application Publication No. 2006-322875) discloses a technique of securely attaching a bent wire to a resin sensor unit while avoiding increase of the number of parts.

More particularly, an IC is placed first within a case housing in reference to a side wall of the case housing. The wire and an IC lead are drawn out from the case housing along an axis of the sensor unit and covered with a first resin molding part. The sensor unit is placed to a mold, taking into account an angle of the side wall. Resin is charged into the mold with the wire being bent at a right angle to the sensor unit, thereby to resin mold an outer peripheral area of the sensor unit. This provides a second resin molding part while forming a bent part for securing the bent wire.

Patent Literature 1 describes that such a manufacturing method allows placement of the IC on a predetermined position within the case housing, and adjustment of the direction of drawing the wire from the case housing. In addition, the wire is bent and fixed with the bent part formed by resin molding, which dispenses with any separate part, and thus firmly fixed to enhance reliability as a rotation detection device for a vehicle.

Patent Literature 2 (Japanese Unexamined Patent Application Publication No. 2004-257867) discloses a resin integrally molded rotation speed sensor for preventing an electric wire or a lead terminal from being positioned on one side inside a sensor unit or being exposed to the outside.

According to the above technique, the electric wire or the lead terminal connected to a rotation speed detection device is inserted into the rotation speed sensor to be limited in position. While a position limiting element for limiting the position of the electric wire or the lead terminal is held from the outside, the rotation speed detection device and other elements are integrally resin molded. Such a technique prevents molding pressure from being applied to a connecting point between the rotation speed detection device and the electric wire or the lead terminal, thereby to avoid disconnection and to achieve a uniformed thickness of the resin. Such an arrangement can satisfy various needs for changing the outer configuration.

CITATION LIST

Patent Literature

Patent Literature 1: Japanese Unexamined Patent Application Publication No. 2006-322875 (paragraphs 0024 to 0029)

Patent Literature 2: Japanese Unexamined Patent Application Publication No. 2004-257867 (paragraphs 0005, 0006, 0018)

SUMMARY OF INVENTION

Technical Problem

Both the above conventional sensors are substantially L-shaped in which a mounting base attached to the vehicle integrally formed with the sensor unit with a sensor element projecting from the mounting base. In other words, the conventional sensors have asymmetric geometry. Thus, resin cooling speed varies with portions of the resin during the resin molding process, which produces difference in shrinkage of the resin and destabilizes the direction of projection of the sensor unit from the mounting base. Such a construction results in inadequate relative position between a rotary element provided in a wheel and the sensor element with the sensor being attached to the vehicle, which disadvantageously mars the measurement accuracy for the wheel speed.

An object of the present invention is to provide a wheel speed sensor capable of stabilizing the direction of projection of a sensor unit when attached to a vehicle in order to eliminate the above disadvantage.

Solution to Problem

A characteristic feature of a wheel speed sensor according to the present invention lies in including a mounting base providing a first contacting part and a second contacting part when attached to a vehicle to come into contact with the vehicle at two positions of the first contacting part and the second contacting part, a sensor unit projecting from a position between the first contacting part and the second contacting part and inclining toward the first contacting part, the sensor unit being resin molded integrally with the mounting base and including a signal detection device provided in a distal end of the sensor unit, and a fixing member pressing and fixing the mounting base to the vehicle at a position between the first contacting part and the sensor unit.

When the mounting base and the sensor unit projecting from the mounting base are integrally resin molded as in the above arrangement, heat generated in the resin molding easily accumulates in the vicinity of a boundary between the mounting base and the sensor unit. Further, while the temperature of the resin in the vicinity of a gate for charging the resin tends to be high depending on the position of the gate, the temperature of the resin remote from the gate tends to be low. Thus, the resin cooling speed in a specific part is lowered to increase heat shrinkage. As a result, deformation occurs between the mounting base and the sensor unit with angular change to decrease the relative angle therebetween.

With the above arrangement, the mounting base comes into contact with the vehicle at two positions of the first contacting part and the second contacting part, and the distal end of the sensor unit projects from the mounting base, inclining toward the first contacting part. In addition, the fixing member is provided between the first contacting part and the sensor unit for pressing and fixing the mounting base to the vehicle. Thus, when the fixing member presses the mounting base toward the vehicle, the mounting base is bent and deformed to move close to the vehicle while the distal end of the sensor unit moves away from the first contacting part.

In this manner, the wheel speed sensor according to the present invention is capable of correcting the angular change occurring between the mounting base and the sensor unit in the resin molding process when the wheel speed sensor is attached to the vehicle. As a result, the wheel speed sensor can measure the rotation speed of an axle accurately.

Another characteristic feature of the wheel speed sensor according to the present invention lies in that a projection is formed in at least one of the second contacting part and a portion of the vehicle contacting the second contacting part to project toward a side of an opposite portion contacting the projection.

Providing such a projection can widen a gap between the mounting base and the vehicle at the second contacting part. With this, the sensor unit projecting from the mounting base changes its posture to move away from a portion of the vehicle that contacts the second contacting part. More particularly, even when the sensor unit should project at a right angle to the mounting surface of the vehicle, for example, the mounting base is moved away from the mounting surface at the side of the second contacting part. On the other hand, the sensor unit changes its posture to move in a direction substantially perpendicular to the mounting base with the correction of the projecting direction. Therefore, the arrangement with this feature can alleviate the adverse influence of the angle change of the sensor unit resulting from the heat shrinkage, and improve the accuracy in attachment of the wheel speed sensor.

According to one aspect of the wheel speed sensor of the present invention, a space may be defined in a position of the mounting base displaced in an opposite direction of a projecting direction of the sensor unit.

Providing such a space for changing the shape of the resin mold product can produce difference in cooling speed between a portion of the mounting base near the projecting direction of the sensor unit and a portion of the mounting base positioned in the opposite direction of the projecting direction of the sensor unit in resin-molding the wheel speed sensor. More particularly, the amount of the resin per unit volume is reduced in the portion provided with the space to increase the cooling speed. On the other hand, the amount of the resin per unit volume is increased in the portion provided with no space to reduce the cooling speed. As a result, the resin shrinkage becomes large at the portion provided with no space to deform the mounting base per se to recessed back from the sensor unit. This allows the opposite ends of the mounting base to be always brought into contact with the vehicle when the mounting base is attached to the vehicle. When the mounting base, which have the first contacting part and the second contacting part formed at the opposite ends thereof, is moved close to and brought into contact with the vehicle, an intermediate area of the mounting base is moved away from the vehicle. Then, the fixing member, which is positioned between the first contacting part and the sensor unit, is operated to resiliently urge and fix the mounting base to the vehicle. In this manner, this arrangement can apply a resilient force to the mounting base when fixing the mounting base and can maintain a condition for a long period of time in which the fixing member urges and secures the mounting base to the vehicle at the position between the first contacting part and the second contacting part. As a result, the wheel speed sensor can prevent the positional change of the sensor unit attached to the vehicle.

The space is preferably a thinner part.

Providing such a thinner part increases the shrinkage of the resin at the side with no thinner part and deforms the mounting base per se to be recessed back from the sensor unit. As a result, the wheel speed sensor can prevent the positional change of the sensor unit attached to the vehicle.

According to one aspect of the wheel speed sensor of the present invention, the fixing member may be a bolt extending through the mounting base and screwed to the vehicle, and a mounting hole of the mounting base receiving the fixing member may be formed by embedding a sleeve in the mounting base, the sleeve being made of a material harder than resin forming the mounting base.

In order to fix the mounting base to the vehicle, the fixing member has a bolt, for example, to be screwed to the vehicle to press and secures the mounting base to the vehicle. Meanwhile, the resin forming the mounting base easily deforms over the years, and thus the portion contacting the fixing member may be deformed to cancel the resilient force applied to the mounting base, which may change the posture of the mounting base. Since the fastening element presses the sleeve to the surface of the vehicle in fastening the fixing member in the above arrangement, the position of the sleeve is naturally or uniquely determined. In this time, the sleeve usually has an axis stabilized perpendicularly to the mounting surface of the vehicle. With this arrangement, the sleeve is embedded in the mounting base. Thus, once the position of the sleeve is determined, the position of the resin surrounding the sleeve is determined. The position of the resin around the sleeve is restricted through the sleeve in fastening the fixing member, which can apply the resilient force to a wide area of the resin. As a result, such an arrangement can maintain the mounting base in the resiliently pressed condition for a long period of time.

BRIEF DESCRIPTION OF DRAWINGS

FIG. 5 is a graph showing results of positional correction of the sensor unit; and FIG. 6 is a schematic view of the wheel speed sensor of the present invention according to an alternative embodiment.

DESCRIPTION OF EMBODIMENTS

[Overall Configuration]

A wheel speed sensor S according to the present invention will be described in detail hereinafter.

Figure 1:
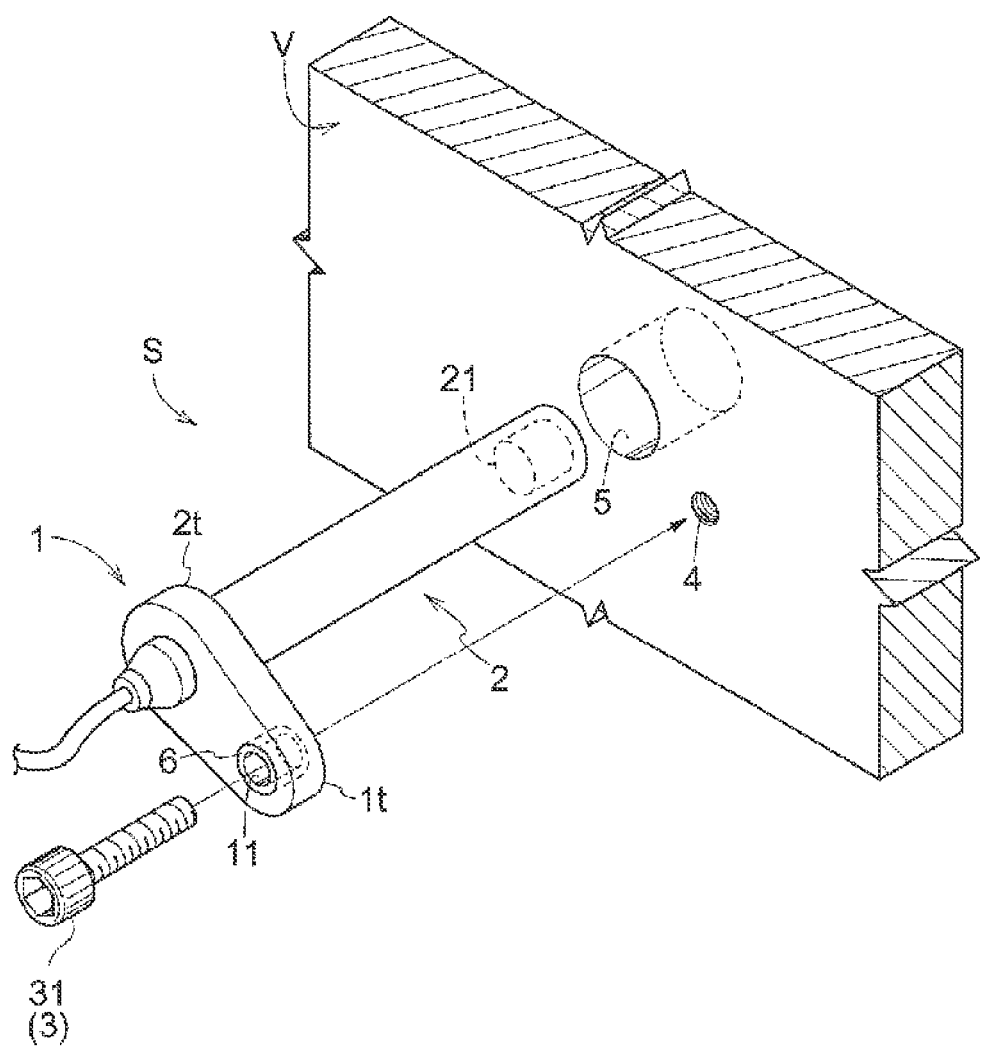
FIG. 1 is a perspective view showing a mounting condition of a wheel speed sensor of the present invention according to a first embodiment.

FIG. 1 shows a mounting condition of the wheel speed sensor S (referred to simply as "sensor S" hereinafter) according to the current embodiment. The sensor S is arranged in the vicinity of an axle (not shown) to measure rotating speed of a rotary magnetic element attached to the axle. The sensor S includes a mounting base 1 for mounting the sensor to a vehicle V, and a sensor unit 2 projecting from the mounting base 1 and having a signal detection device 21 embedded in a distal end thereof. The mounting base 1 and the sensor unit 2 are integrally formed with each other by resin molding. The mounting base 1 has a mounting hole 11 with a plain tubular inner surface, for example. A bolt 31 acting as a fixing member 3 is inserted into the mounting hole 11 and screwed to a threaded hole 4 formed in the vehicle V. The sensor unit 2 extends through a through hole 5 formed in the vehicle V to project in a direction opposite to the mounting base 1, and then is fixed.

[Sensor Unit]

The sensor unit 2 is an elongated member extending from the mounting base 1 and provided with the signal detection device 21 embedded in the distal end thereof. Such a signal detection device 21 may be selected from various kinds of devices including a hall-effect integrated circuit. The signal detection device 21 is embedded in the sensor unit 2 in various postures depending on the type of the sensor S. A cable is connected to the signal detection device 21, for example, and drawn out to the outside from the other end of the sensor unit 2 through the interior of the sensor unit 2.

In manufacturing the sensor S, only the sensor unit 2 provided with the signal detection device 21 is primarily molded, for example. The signal detection device 21 and an associated terminal or the like are placed in a primary molding die to undergo injection molding with primary molding resin. Then, the primary molded product is placed in a secondary resin molding die to undergo secondary molding with secondary molding resin, thereby to form the mounting base 1 integrally with the sensor unit.

[Mounting Base]

Even after the secondary molding is completed for the sensor S, a certain amount of error is produced in a relative position between the mounting base 1 and the sensor unit 2. This results from the asymmetric geometry of the sensor S causing difference in cooling speed for resin in various portions in the secondary molding, which leads to variations in shrinkage of the resin. In this connection, the sensor S according to the current embodiment is configured to correct the error as follows.

Figure 2:
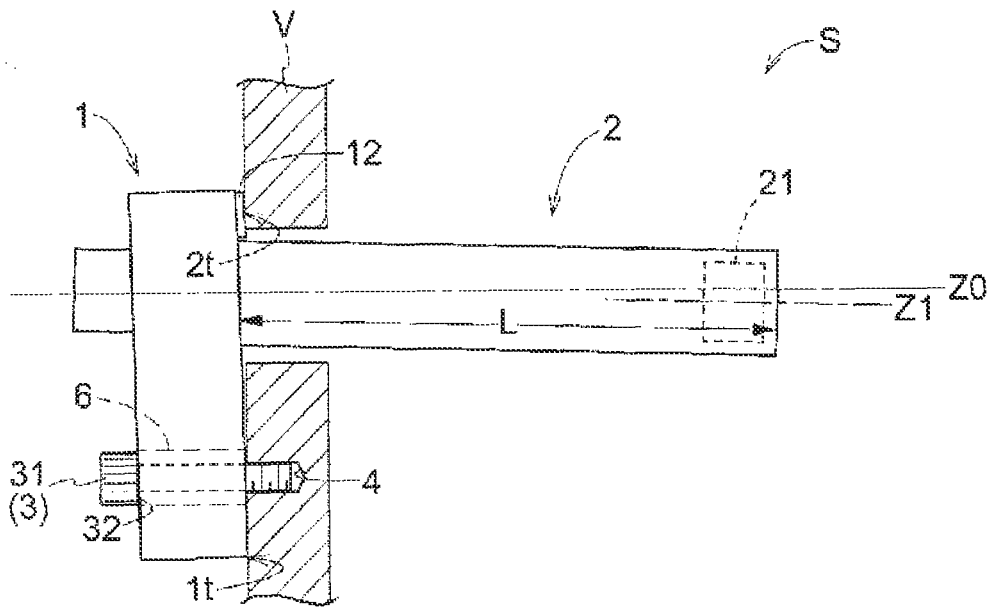
FIG. 2 is an illustrative view showing a condition in which a mounting base is brought into contact with a vehicle in the first embodiment.

As illustrated in FIG. 2, for example, the mounting base 1 is brought into contact with the vehicle V at opposite ends thereof and is out of contact with the vehicle V at a central portion thereof. In FIG. 2, the mounting base 1 is spaced away from the vehicle V at the central portion thereof due to the presence of a first contacting part 1t provided at one end of the mounting base 1 and a second contacting part 2t provided at the other end of the mounting base 1. The first contacting part 1t additionally has a projection 12.

The projection 12 acts to cause the mounting base 1 to space apart from the vehicle V at the central portion thereof, and thus may be disposed in the vehicle V or may be disposed in both of the mounting base 1 and the vehicle V. Further, the projection 12 is not necessarily formed integrally with the mounting base 1 or the vehicle V, but may be provided through a separate part adhered to the mounting base 1 or the vehicle V.

Figure 3:
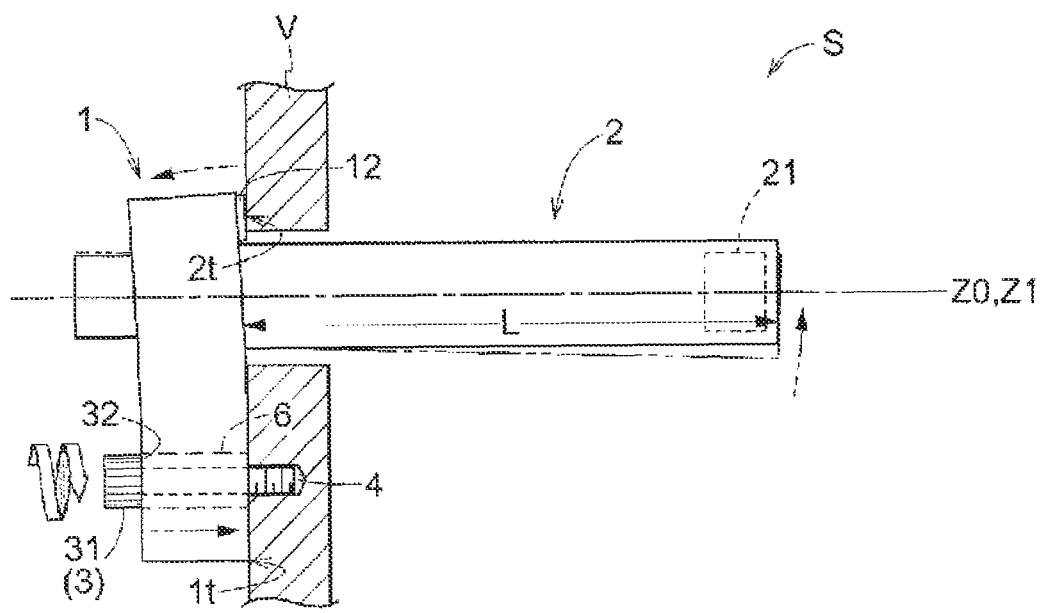
FIG. 3 is an illustrative view showing a condition in which the mounting base is fixed to the vehicle through a fixing member.

The mounting base 1 with its central portion being spaced from the vehicle V in this manner is fixed to the vehicle V through a bolt 31, as shown in FIG. 3. The bolt 31 is disposed between the sensor unit 2 and the first contacting part 1t. The bolt 31 is fastened to the vehicle V to cause a head 32 of the bolt 31 to resiliently urge a portion of the mounting base 1 between the first contacting part 1t and the second contacting part 2t toward the vehicle V. Such resilient urging action allows the mounting base 1 to be fixed to the vehicle V for a long time of period.

When the fixing member 3 has the bolt 31 in this manner, a sleeve 6 is preferably embedded in the mounting hole 11 formed in the mounting base 1. The sleeve 6 is made of a material harder than the resin forming the mounting base 1, usually a metal such as steel.

In order to fix the mounting base 1 to the vehicle V securely, the bolt 31 is preferably screwed into the vehicle V to continuously press the mounting base 1 toward the vehicle V. In this, however, the mounting base 1 is made of resin and thus easily deforms over time. When the bolt 31 is brought into local contact with the mounting base 1, for example, the contacting portion of the mounting base 1 may gradually deform to cancel the pressing force applied on the mounting base 1.

To overcome the above defect, the metal sleeve 6 is embedded in the mounting base 1 according to the current embodiment. With this arrangement, when the bolt 31 presses the sleeve 6 on the vehicle V to bring an end face of the sleeve 6 into contact with the vehicle V to fix the sleeve 6, the entire outer circumferential surface of the sleeve 6 acts on the mounting base 1, thereby to urge the mounting base 1 toward the vehicle V. In particular, the sleeve 6 is directly held by the vehicle V and the bolt 31 when having a length extending over the thickness of the mounting base 1. As a result, a greater urging force acts on the mounting base 1, thereby to maintain the sensor unit 2 in an optimal mounting condition for a long period of time.

[Correction of Sensor Unit]

FIG. 2 shows a condition in which the mounting base 1 is attached to the vehicle V. In this, the second contacting part 2t is represented by the projection 12 provided in the mounting base 1. With this arrangement, simple action to bring the sensor S into contact with the vehicle V allows correction of the tilt of the sensor unit 2 by a predetermined angle. FIG. 2 shows an example in which the sensor unit 2 is disposed in a direction perpendicular to the mounting surface of the vehicle V. In FIG. 2, the sensor unit 2, which should be oriented in a direction $Z_0$, is axially oriented in a direction $Z_1$ to cause the distal end of the sensor unit 2 to still tilt toward the first contacting part t1. The bolt 31 is further fastened in this condition to cause the central portion of the mounting base 1 to contact the vehicle V as shown in FIG. 3. As a result, the tilt of the sensor unit 2 at its distal end is corrected toward the perpendicular direction to allow the axial direction $Z_1$ of the sensor unit 2 to agree with the initial direction $Z_0$.

The shape or the position of the projection 12 is determined depending upon the configuration of the sensor S without the projection 12. For example, a greater projecting length L of the sensor unit 2 results in greater angular deformation after completing the injection molding. In such a case, the projection 12 needs to be high.

Further, when the mounting base 1 or the sensor unit 2 has a complicated outer configuration, the sensor unit 2 may be deformed at the initial stage beyond a plane including the mounting base 1 and the sensor unit 2. Correction of such out-of-plane deformation may be corrected by positioning the projection 12 properly as shown in FIG. 4, for example.

Figure 4:
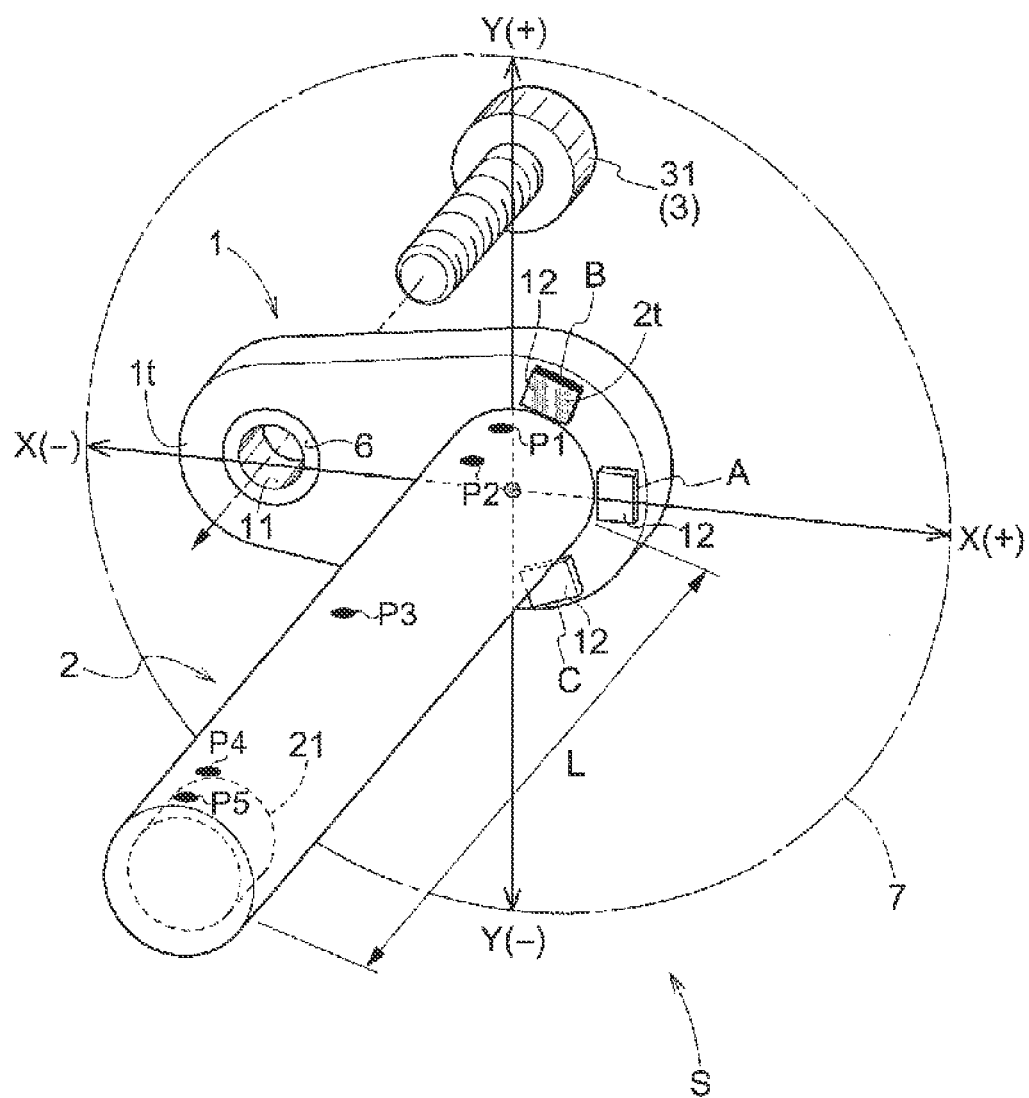
FIG. 4 is an illustrative view showing formation of projections on the mounting base.

FIG. 4 shows an example in which an XY plane is determined in a direction perpendicular to the axis of the sensor unit 2, and an X axis is determined in a direction connecting the mounting hole 11 to the axis of the sensor unit 2. As illustrated in FIG. 4, the projection 12 may be provided in a position on the X axis (point A), in a position on the positive side of the Y axis (point B), or in a position on the negative side of the Y axis (point C).

FIG. 5 shows positions of the distal end of the sensor unit 2 when the sensor S without the projection 12 and the sensor S with the projection 12 formed at point B in FIG. 4 are attached to the vehicle V. As shown in FIG. 4, the sensor unit 2 is provided with five markings P1 to P5 on its surface, which markings are arranged in order from the proximal end side. FIG. 5 illustrates positions of the five markings in an xy-coordinate when the sensor S is fixed.

In FIG. 5, while marks Δ represents the markings in the sensor S without the projection 12, marks ■ represents the markings in the sensor S with the projection 12 formed at point B. It is understood that the marks Δ are distant in order from the marking P1 at the proximal end side toward a minus direction of the x-coordinate. As seen, the mounting base 1 and the sensor unit 2 are angularly deformed to move close to each other within the plane including the mounting base 1 and the sensor unit 2. The distal end of the sensor unit 2 extends beyond a dimensional standard limit 7.

On the other hand, as understood from the marks ■ for the sensor with the projection 12, the distal end of the sensor unit 2 is corrected toward a plus direction of the y-coordinate and located within the dimensional standard limit 7. The correcting direction can be desirably determined depending on the position where the projection 12 is formed. As shown in FIG. 4, the projection 12 is located in the plus side in both of the x-coordinate and the y-coordinate. Thus, when the bolt 31 is fastened between the projection 12 and the first contacting part 1t, he mounting base 1 is resiliently deformed toward the vehicle V to allow the plane of the mounting base 1 in the vicinity of the projecting sensor unit 2 to turn to the plus direction in both of the x-coordinate and the y-coordinate. In this manner, the correcting direction can be easily determined depending on the position where the projection 12 is formed. Therefore, the position and the height of the projection 12 may be determined to correct bending of the sensor S based on its initial bending properties.

[Alternative Embodiments]

The mounting base 1 of the sensor S according to the present invention may be curved as shown in FIG. 6. More particularly, a thinner part 8 is provided in a position of the mounting base 1 displaced in the opposite direction of the projecting direction of the sensor unit 2 to allow the mounting base 1 per se to be recessed back from the sensor unit 2.

Providing the thinner part 8 results in a reduced amount of resin per unit volume in the part where the thinner part 8 is formed in the resin integral molding process, which leads to increased cooling speed for the resin. On the other hand, the part of the mounting base 1 with no thinner part adjacent to the sensor unit 2 needs an increased amount of resin per unit volume, which leads to reduced cooling speed for the resin. Consequently, the resin largely shrinks in the part of the mounting base 1 without the thinner part 8, thereby bending and deforming the mounting base 1 to be recessed back from the part with no thinner part. This causes the first contacting part 1t and the second contacting part 2t to reliably come into contact with the vehicle V when the mounting base 1 is brought into contact with the vehicle V, and causes the area between the first contacting part 1 t and the second contacting part 2t to space from the vehicle V. As a result, a bending force reliably acts on the mounting base 1 when the bolt 31 is fastened, thereby to stably fix the mounting base 1 to the vehicle V for a long period of time.

The initial bending direction of the mounting base 1 is not determined only by the arrangement of the thinner part 8, but is variable with the position of a gate in injecting resin or the shape of a resin molded product. It is desirable to deform the mounting base 1 so that the first contacting part 1t and the second contacting part 2t reliably come into contact with the vehicle V, although different sensors have different bending deformation conditions.

INDUSTRIAL APPLICABILITY

The present invention may be used in various sensors including a mounting base and a sensor unit projecting from the mounting base, in which predetermined angular deformation occurs between the mounting base and the sensor unit.

REFERENCE SIGNS LIST 1 mounting base
11 mounting hole
12 projection
2 sensor unit
21 signal detection device
3 fixing member
31 bolt
6 sleeve
8 thinner part
V vehicle
1t first contacting part
2t second contacting part
S wheel speed sensor

The invention claimed is:
1. A wheel speed sensor comprising:
a mounting base providing a first contacting part and a second contacting part when attached to a vehicle to come into contact with the vehicle at two positions of the first contacting part and the second contacting part;
a sensor unit projecting from a position between the first contacting part and the second contacting part and inclining toward the first contacting part, the sensor unit being resin molded integrally with the mounting base and including a signal detection device provided in a distal end of the sensor unit;
a fixing member pressing and fixing the mounting base to the vehicle at a position between the first contacting part and the sensor unit; and
a projection formed in the second contacting part to project toward a side of the vehicle contacting the projection,
wherein a central portion of the mounting base is spaced away from the vehicle due to the projection.
2. The wheel speed sensor according to claim 1,
wherein a space is defined between the mounting base and the vehicle, due to the projection causing the mounting base to be spaced apart from the vehicle.
3. The wheel speed sensor according to claim 2,
wherein the space is thinner than the mounting base along the projecting direction.
4. The wheel speed sensor according to claim 1,
wherein the fixing member is a bolt extending through the mounting base and screwed to the vehicle, and
wherein a mounting hole of the mounting base receiving the fixing member is formed by embedding a sleeve in the mounting base, the sleeve being made of a material harder than resin forming the mounting base.

* * * * *